(12) United States Patent
Fujimoto et al.

(10) Patent No.: US 10,132,273 B2
(45) Date of Patent: Nov. 20, 2018

(54) CONTROL SYSTEM OF ENGINE

(71) Applicant: Mazda Motor Corporation, Aki-gun, Hiroshima (JP)

(72) Inventors: Masahiko Fujimoto, Hiroshima (JP); Hiroyuki Yamashita, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 213 days.

(21) Appl. No.: 15/297,946

(22) Filed: Oct. 19, 2016

(65) Prior Publication Data
US 2017/0138313 A1 May 18, 2017

(30) Foreign Application Priority Data
Nov. 12, 2015 (JP) .................. 2015-222424

(51) Int. Cl.
*F02D 41/00* (2006.01)
*F02D 41/38* (2006.01)
(Continued)

(52) U.S. Cl.
CPC ......... *F02M 25/0227* (2013.01); *F01N 3/005* (2013.01); *F01N 5/02* (2013.01); *F02D 41/005* (2013.01); *F02D 41/0025* (2013.01); *F02D 41/107* (2013.01); *F02D 41/38* (2013.01); *F02M 25/0222* (2013.01);
(Continued)

(58) Field of Classification Search
CPC .............. F02M 25/0227; F02M 25/03; F02M 25/0222; F01N 5/02; F01N 3/005; F01N 2240/36; F01N 2240/02; F02N 11/0814; F02D 41/107; F02D 41/0025; F02D 41/005; F02D 41/38; F02D 2041/389; F02D 2200/501; F02D 2200/1002; Y02T 10/16; Y02T 10/20; Y02T 10/47
See application file for complete search history.

(56) References Cited

U.S. PATENT DOCUMENTS

2004/0003781 A1  1/2004 Yuki et al.
2012/0304639 A1* 12/2012 Yonushonis ............ F01N 3/208
                                                        60/605.1
(Continued)

FOREIGN PATENT DOCUMENTS

JP  2004068776 A  3/2004
JP  2009209809 A  9/2009

*Primary Examiner* — Grant Moubry
(74) *Attorney, Agent, or Firm* — Alleman Hall Creasman & Tuttle LLP

(57) ABSTRACT

A control system of an engine including a cylinder, an intake passage, and an exhaust passage is provided, that includes a fuel injector for injecting fuel into the cylinder, an exhaust gas recirculation (EGR) passage communicating the intake passage with the exhaust passage and for recirculating, as EGR gas, a portion of exhaust gas in the exhaust passage back to the cylinder, an EGR valve capable of controlling an EGR ratio by changing an EGR gas amount recirculated to the cylinder, a water injector for injecting water into the cylinder, and a controller. The controller controls the EGR valve to set a target EGR ratio according to an engine operating state so as to bring an actual EGR ratio to the target EGR ratio, and when the target EGR ratio is increased, the controller controls the water injector to increase an amount of the water injected into the cylinder.

6 Claims, 12 Drawing Sheets

(51) Int. Cl.
*F02M 25/022* (2006.01)
*F02M 25/03* (2006.01)
*F01N 5/02* (2006.01)
*F02D 41/10* (2006.01)
*F02N 11/08* (2006.01)
*F01N 3/00* (2006.01)

(52) U.S. Cl.
CPC ......... F02M 25/03 (2013.01); F02N 11/0814 (2013.01); *F01N 2240/02* (2013.01); *F01N 2240/36* (2013.01); *F02D 2041/389* (2013.01); *F02D 2200/1002* (2013.01); *F02D 2200/501* (2013.01); *Y02T 10/16* (2013.01); *Y02T 10/20* (2013.01); *Y02T 10/47* (2013.01)

(56) References Cited

U.S. PATENT DOCUMENTS

| | | |
|---|---|---|
| 2013/0218438 A1 | 8/2013 | Surnilla et al. |
| 2015/0300296 A1* | 10/2015 | Mulye .................. F02M 25/07 123/676 |

* cited by examiner

CONTROL SYSTEM OF ENGINE

BACKGROUND

The present invention relates to a control system of an engine including an engine formed with a cylinder, an intake passage for introducing air into the engine, and an exhaust passage through which exhaust gas is discharged from the engine.

Conventionally, engines are formed with a particular passage communicating an exhaust passage with an intake passage, and perform EGR (Exhaust Gas Recirculation) through this particular passage. In the EGR, EGR gas that is a portion of exhaust gas in the exhaust passage is recirculated back to the intake passage and a cylinder.

For example, JP2009-209809A discloses an engine for premixing fuel and air, and causing a resultant mixture gas to self-ignite. In the engine, EGR is performed to introduce an inactive gas into a cylinder, so as to extend an ignition delay time of the mixture gas. Thus, mixing of the air and the fuel is stimulated.

The EGR gas passes through the particular passage and the intake passage, and then is introduced into the cylinder. Therefore, in a case where an increase of an EGR ratio that is a ratio of the EGR gas with respect to all gas in the cylinder is requested, a time delay occurs until the EGR ratio actually increases. For this reason, in a transition state of the engine, the EGR ratio may not suitably be increased and the mixture gas may not suitably combust. For example, in the transition state, if the EGR ratio does not reach a target value and the amount of EGR gas becomes insufficient, pre-ignition of the mixture gas may occur and cause combustion noises, smoke production increases, etc. In this regard, in order to avoid an unsuitable combustion (e.g., pre-ignition), it may be considered to reduce the fuel supply to the cylinder until the EGR ratio rises up to a suitable value. However in this case, engine responsiveness, such as acceleration performance, degrades.

SUMMARY

The present invention is made in view of the above problems and aims to provide a control system of an engine, which is capable of improving responsiveness of the engine in a transition state, while realizing suitable combustion.

According to one aspect of the present invention, a control system of an engine including a cylinder, an intake passage for introducing intake air into the cylinder, and an exhaust passage into which exhaust gas is discharged from the cylinder is provided. The system includes a fuel injector for injecting fuel into the cylinder, an EGR passage communicating the intake passage with the exhaust passage and for recirculating, as EGR gas, a portion of exhaust gas in the exhaust passage back to the cylinder, an EGR valve capable of controlling an EGR ratio by changing an amount of the EGR gas recirculated to the cylinder, the EGR ratio being a ratio of the EGR gas with respect to all gas inside the cylinder, a water injector for injecting water into the cylinder, and a controller for controlling the fuel injector, the EGR valve, and the water injector. The controller controls the EGR valve to set a target EGR ratio according to an operating state of the engine so as to bring an actual EGR ratio to the target EGR ratio, and when the target EGR ratio is increased, the controller controls the water injector to increase an amount of the water injected into the cylinder, the target EGR ratio being a target value of the EGR ratio.

According to the above configuration, when the target EGR ratio is increased, the water which is neither fuel nor air (hereinafter, suitably referred to as "the inactive substance") is injected into the cylinder. Thus, insufficiency of the EGR ratio (i.e., EGR gas amount) accompanying a delay of the change of the EGR gas amount is compensated by the water, and a suitable amount of the inactive substance can be introduced into the cylinder. Therefore, there is no need to reduce the fuel in accordance with the insufficiency of the inactive substance or the reduction amount can be suppressed, and as a result, responsiveness of the engine can be improved while realizing suitable combustion.

In the above configuration, the water may be one of supercritical water and subcritical water.

Thus, a suitable amount of the water can be introduced into the cylinder more reliably while suppressing an energy loss.

Specifically, the supercritical water and the subcritical water have a higher density than water in a normal gas phase (water vapor). Therefore, by injecting the one of supercritical water and subcritical water into the cylinder, a large amount of water can efficiently be introduced into the cylinder compared to injecting the water in the gas phase. Further, although water in a liquid phase requires latent heat in order to vaporize, the supercritical water and the subcritical water require little to no latent heat at all. Therefore, if the water in the liquid phase is injected into the cylinder, a temperature inside the cylinder may significantly drop due to the vaporization of the injected water inside the cylinder, and thermal efficiency may degrade. On the other hand, if the one of supercritical water and subcritical water is injected into the cylinder, such a significant temperature drop and thermal efficiency degradation can be avoided.

Further in the above configuration, the controller may control the water injector to increase the amount of the water injected into the cylinder in accordance with the increase of the target EGR ratio, and then reduce the water injection amount over time.

Thus, the amount of the inactive substance in the cylinder can be maintained suitably until the actual EGR ratio reaches the target EGR ratio after the target EGR ratio is increased. Therefore, the suitable combustion can be achieved more reliably and the engine performance can be improved.

Further in the above configuration, the controller may control the water injector to increase the amount of the water injected into the cylinder when the target EGR ratio is increased and fuel injection into the cylinder from the fuel injector is suspended in accordance with deceleration of the engine and then is resumed.

Thus, in a case where acceleration after decelerating is performed and an acceleration performance is particularly required, the reduction amount of the fuel can be suppressed while achieving the suitable combustion, and also the responsiveness of the engine can be improved effectively.

Further in the above configuration, the controller may control the water injector to increase the amount of the water injected into the cylinder when the target EGR ratio is increased and fuel injection into the cylinder from the fuel injector is automatically suspended in accordance with a stop of a vehicle and then is resumed, the engine mounted on the vehicle.

Thus, when the engine resume and reacceleration from an automatic suspension of the fuel injection, i.e., a so-called idle stop, is performed and the acceleration performance is particularly required, the reduction amount of the fuel can be suppressed while achieving the suitable combustion, and also the responsiveness of the engine can be improved effectively.

Further in the above configuration, the controller may control the water injector to increase the amount of the water injected into the cylinder when the target EGR ratio is increased and an engine load is increased.

Thus, the acceleration performance of the engine can effectively be improved while suitably adjusting the EGR ratio according to the engine load.

DETAILED DESCRIPTION OF EMBODIMENTS

Figure 1:
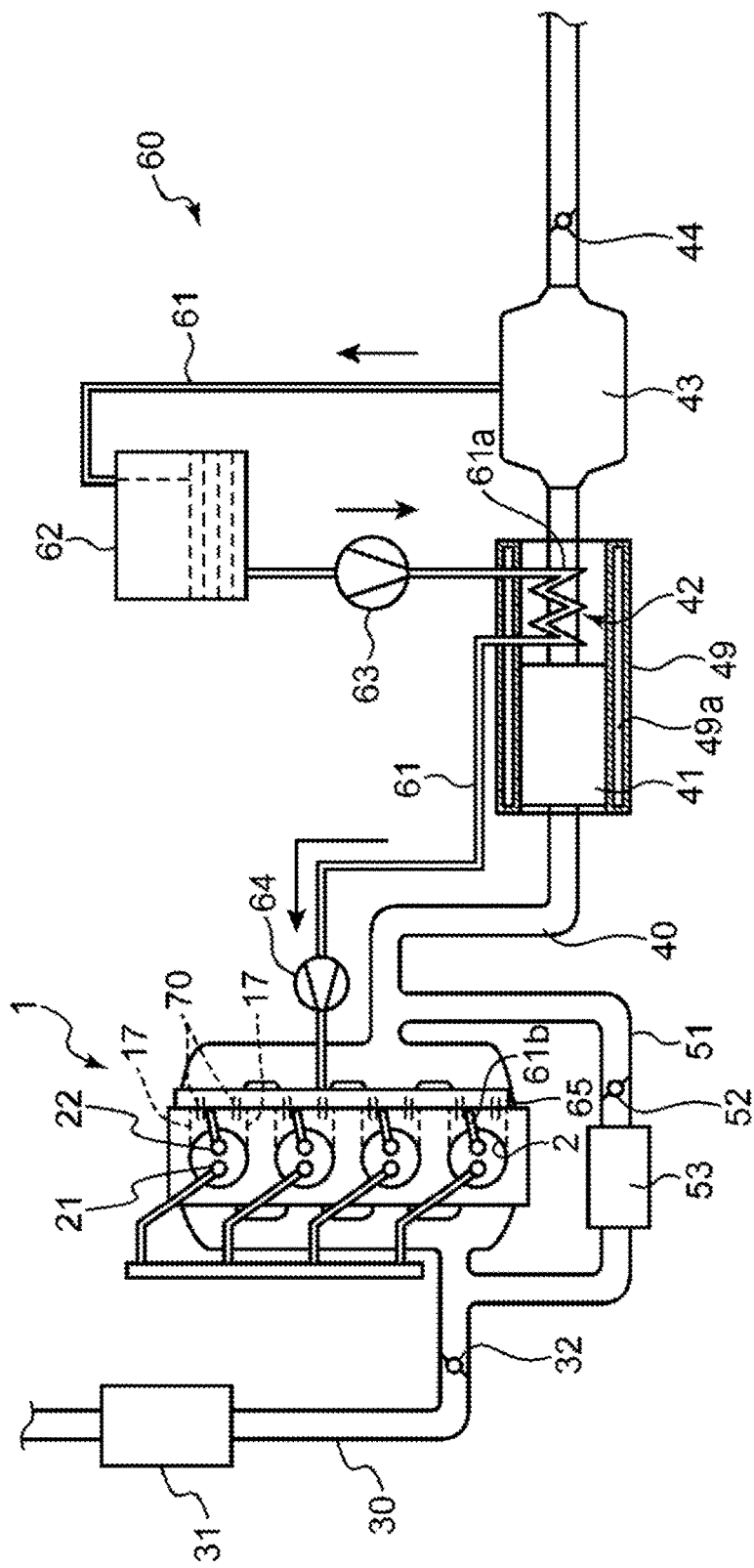
FIG. 1 is a view illustrating a structure of an engine system according to one embodiment of the present invention.

FIG. 1 is a view illustrating a structure of an engine system according to one embodiment of the present invention. The engine system of this embodiment includes an engine 1 of a four stroke type, an intake passage 30 for introducing intake air (air) for combustion into the engine 1, an exhaust passage 40 for discharging exhaust gas generated in the engine 1, and a water circulation device 60.

The engine 1 is, for example, a four-cylinder engine having four cylinders 2. In this embodiment, the engine 1 is driven by receiving a fuel containing gasoline. The engine system of this embodiment is mounted on a vehicle, and the engine 1 is used as a drive source of the vehicle.

(1) Engine

Figure 2:
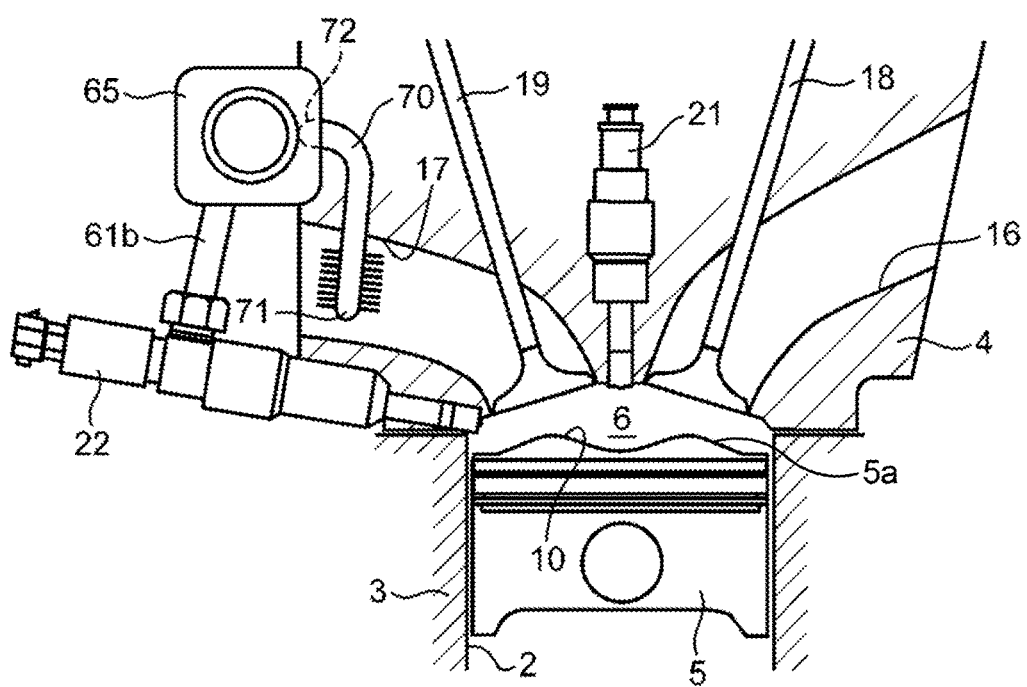
FIG. 2 is a schematic cross-sectional view of an engine.

FIG. 2 is a schematic cross-sectional view of the engine 1.

The engine 1 includes a cylinder block 3 formed therein with the cylinders 2, a cylinder head 4 formed on the cylinder block 3, and pistons 5 fitted into the cylinders 2 to be reciprocatable (in up-and-down directions), respectively.

A combustion chamber 6 is formed above each piston 5. The combustion chamber 6 is a so-called pent-roof type, and a roof surface of the combustion chamber 6 (a bottom surface of the cylinder head 4) has a triangular roof shape formed by two inclining surfaces on an intake side and an exhaust side.

A crown surface 5a of the piston 5 has a cavity 10 formed by denting, to an opposite side from the cylinder head 4 (downward), an area including a center of the crown surface 5a. The cavity 10 is formed to have a volume corresponding to a major part of the combustion chamber 6 when the piston 5 is at a top dead center (TDC).

The cylinder head 4 is formed with intake ports 16 for introducing air supplied from the intake passage 30 into the cylinders 2 (combustion chambers 6), and exhaust ports 17 for guiding out the exhaust gas generated inside the cylinders 2 to the exhaust passage 40, respectively. In this embodiment, each cylinder 2 is formed with two intake ports 16 and two exhaust ports 17. The cylinder head 4 is further provided with intake valves 18 for opening and closing the intake ports 16 on the cylinder 2 side, and exhaust valves 19 for opening and closing the exhaust ports 17 on the cylinder 2 side, respectively.

Each exhaust port 17 is attached with a heat pipe 70. In this embodiment, each exhaust port 17 is provided with one heat pipe 70, i.e., each cylinder 2 is provided with two heat pipes 70. The heat pipes 70 constitute a part of the water circulation device 60, and a detailed description thereof is given later.

Further, fuel injectors (fuel supplier) 21 for injecting the fuel into the cylinders 2, respectively, are provided to the cylinder head 4. Each fuel injector 21 is arranged so that its tip part is located near a center axis of the corresponding cylinder 2 and oriented toward a substantially center portion of the crown surface of the piston 5.

The fuel injector 21 injects fuel pumped from a fuel pump (not illustrated) into the cylinder 2. In this embodiment, a premixed charge compression self-ignition combustion is performed, in which the fuel and air are premixed to form a mixture gas and the mixture gas is compressed to self-ignite near the TDC on compression stroke (CTDC) throughout all operating ranges of the engine. Accordingly, in the example of FIG. 2, ignition plugs for igniting the gas inside the cylinders 2 are not provided to the engine 1; however, in a case where an additional ignition power is required for suitable combustion of the mixture gas in a cold start etc., the ignition plugs may suitably be provided to the engine 1.

The fuel injector 21 injects into the cylinder 2 the fuel by an amount corresponding to an operating state of the engine 1 at a corresponding timing thereto. In this embodiment, fuel is injected into the cylinder 2 mainly before the CTDC, so as to cause the mixture gas to self-ignite near the CTDC.

The cylinder head 4 is further provided with water injectors 22 for injecting supercritical water into the cylinders 2, respectively. As illustrated in FIG. 2, each water injector 22 is attached to the cylinder head 4 so as to inject the water into the corresponding combustion chamber 6 from a side thereof, and is arranged so that its tip part is oriented toward an inside of the combustion chamber 6 from an inner circumferential surface of the combustion chamber 6. As the water injector 22, for example, an injector for injecting fuel into the cylinder 2, which is used in conventional engines, may be applied, for which a description of a specific structure is omitted here. Note that the water injector 22 injects the supercritical water into the cylinder 2 at about 20 MPa, for example.

The supercritical water is water with a higher temperature and pressure than the critical point of water, has a high density close to liquid phase while molecules move as actively as in gas phase, and does not require latent heat for a phase change into gas or liquid.

Figure 3:
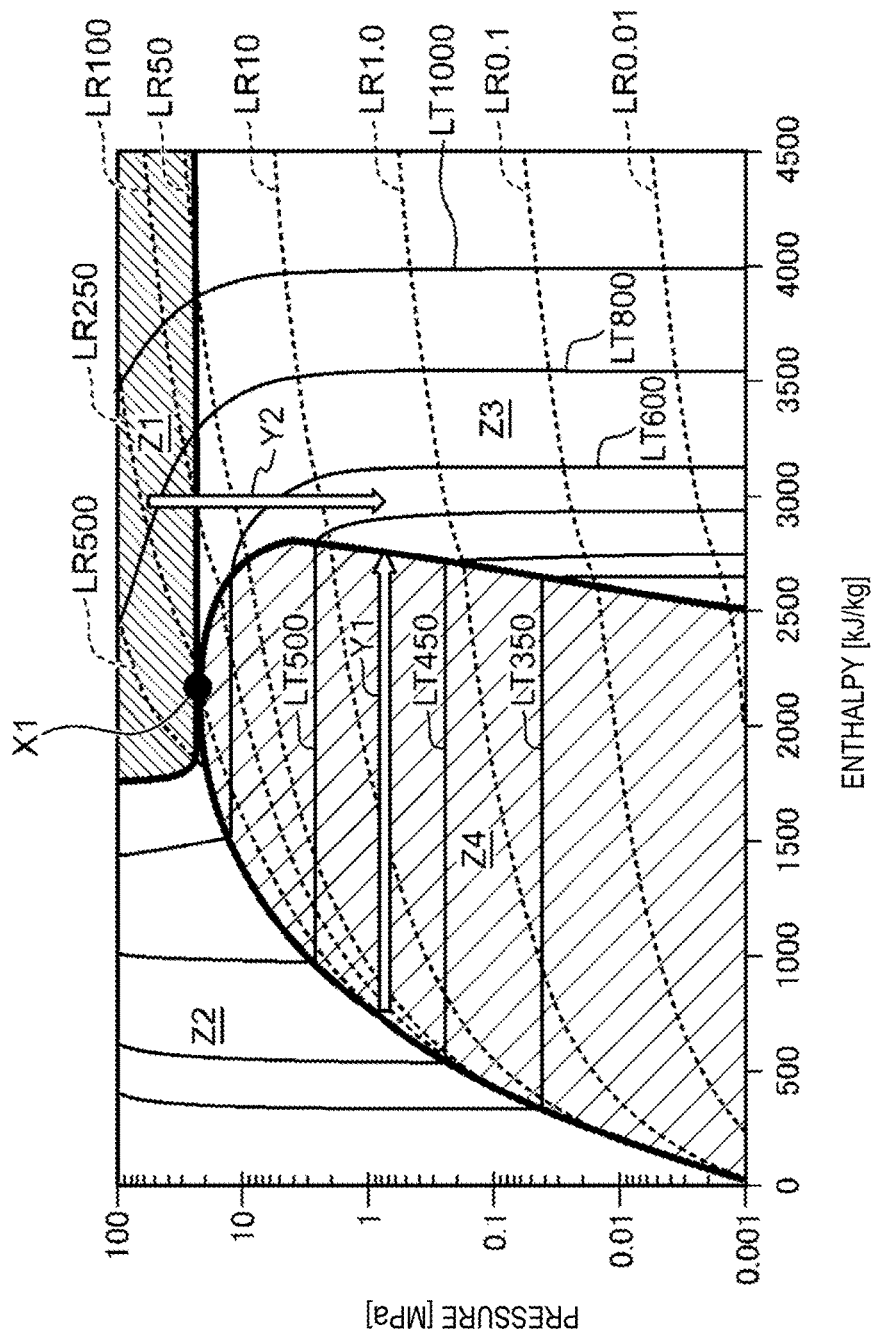
FIG. 3 is a pressure-enthalpy diagram for water, illustrating supercritical water.

A specific description regarding this matter is given with reference to FIG. 3 which is a pressure-enthalpy diagram for water, of which a horizontal axis indicates enthalpy and a vertical axis indicates pressure. In FIG. 3, an area Z2 is an area of liquid, an area Z3 is an area of gas, and an area Z4 is an area of coexisting liquid and gas. Lines LT350, LT400, . . . , LT1000 indicated by solid lines are isothermal lines, each formed by connecting points of the same temperature. The numerals of the lines indicate temperatures (K). For example, LT350 is an isothermal line of 350 K, and LT1000 is an isothermal line of 1,000 K. Further, a point X1 is the critical point and an area Z1 is an area where a temperature and pressure are higher than the critical point X1, and the supercritical water belongs to this area Z1. Specifically, while the critical point of water is at the temperature of 647.3 K and the pressure of 22.12 MPa, the temperature and pressure of the supercritical water are the same or above, in other words, the temperature is 647.3 K or above and the pressure is 22.12 MPa or above.

In FIG. 3, lines LR0.01, LR0.1, LR500 indicated by dashed lines are isopycnic lines, each formed by connecting points of the same density. The numerals of the lines indicate densities (kg/m$^3$). For example, LR0.01 is an isopycnic line of 0.01 kg/m$^3$, and LR500 is an isopycnic line of 500 kg/m$^3$.

As is apparent from comparisons of these isopycnic lines LR with the areas Z1 and Z3, the density of the water within the area Z1, in other words, the supercritical water, is about from 50 kg/m$^3$ to 500 kg/m$^3$, which is close to that of water in the liquid phase and much higher than the density of gas.

Note that the supercritical water generated by the engine system and injected into the cylinders 2 preferably has a density of 250 kg/m$^3$ or above.

Further, as indicated by the arrow Y1 in FIG. 3, water in a normal liquid phase requires a high enthalpy to change into gas. In other words, the water in the normal liquid phase requires a comparatively high latent heat to change into gas. In this regard, as indicated by the arrow Y2, the supercritical water requires almost no enthalpy, in other words, latent heat, to change into water in a normal gas phase.

(2) Intake Passage

The intake passage 30 is provided with an air cleaner 31 and a throttle valve 32 located in this order from its upstream side. The air passes through the air cleaner 31 and the throttle valve 32 and then is introduced into the engine 1.

The throttle valve 32 opens and closes the intake passage 30. Note that, in this embodiment, while the engine is in operation, the throttle valve 32 is basically kept fully opened or nearly fully opened, and only in a limited operation condition (e.g., the engine is stopped) is the throttle valve 32 closed to block the intake passage 30.

(3) Exhaust Passage

The exhaust passage 40 is provided with, in the following order from its upstream side, a purifying system 41 for purifying the exhaust gas, a heat exchanger (temperature increasing device) 42, a condenser 43, and an exhaust shutter valve 44. The heat exchanger 42 and the condenser 43 constitute a part of the water circulation device 60. The purifying system 41 comprises, for example, a three-way catalyst.

In this embodiment, as illustrated in FIG. 1 etc., the purifying system 41 and the heat exchanger 42 are accommodated inside a heat accumulation case 49 for heat retention of the purifying system 41 and the heat exchanger 42. The heat accumulation case 49 has a dual tube structure, of which an outer circumferential wall forms a space 49a therein. The space 49a is filled with a heat accumulation agent, and by this heat accumulation agent, the purifying system 41 and the heat exchanger 42 retain heat. In other words, when exhaust gas at high temperature flows into the purifying system 41 etc. located inside the heat accumulation case 49, the heat accumulation agent within the space 49a is warmed up by the exhaust gas, and then the purifying system 41 and the heat exchanger 42 retains heat by the heat accumulation agent. Examples of the heat accumulation agent include a latent heat accumulation agent that melts by being heated and accumulates thermal energy, such as erythritol, and a chemical heat accumulation agent that causes a chemical reaction by being heated and accumulates thermal energy, such as calcium chloride. By the heat retention with the heat accumulation agent as above, water inside a heat exchanging passage 61a (described later) is effectively increased in temperature by the heat exchanger 42, and the purifying system 41 is kept at a more suitable temperature.

The exhaust shutter valve 44 stimulates a recirculation of EGR gas to the intake passage 30.

Specifically, with the engine system of this embodiment, an EGR passage 51 communicating the intake passage 30 with the exhaust passage 40 is provided, and a portion of the exhaust gas is recirculated to the intake passage 30. In the example of FIG. 1, the EGR passage 51 communicates a part of the intake passage 30 downstream of the throttle valve 32 with a part of the exhaust passage 40 upstream of the purifying system 41. Further, the exhaust shutter valve 44 opens and closes the exhaust passage 40. When the EGR is performed and pressure inside the exhaust passage 40 is low, an opening of the exhaust shutter valve 44 is narrowed to increase pressure inside an upstream part of the EGR passage 51 and stimulate the EGR gas recirculation.

The EGR passage 51 is provided with an EGR valve (EGR ratio controller) 52 for opening and closing the EGR passage 51, and an amount of the EGR gas recirculated to the intake passage 30 is adjusted by adjusting an opening of the EGR valve 52, which controls the EGR ratio that is a ratio of the EGR gas with respect to entire gas in the cylinder 2. Further in this embodiment, the EGR passage 51 is provided with an EGR cooler 53 for cooling the EGR gas passing therethrough, and the EGR gas is recirculated to the intake passage 30 after being cooled by the EGR cooler 53.

When the EGR gas which is an inactive substance other than fuel and air is introduced into the cylinder 2, a ratio of the fuel and air with respect to the entire gas amount inside the cylinder 2 is reduced and the gas temperature increase inside the cylinder 2 is suppressed. Therefore, a reaction speed of the fuel and air is kept low and an ignition delay time (time length from fuel supply into the cylinder 2 until a mixture gas combustion starts) is extended. By extending the ignition delay time, the combustion is generated after sufficiently mixing the fuel and air, and a suitable premixed charge compression self-ignition combustion is realized.

(4) Water Circulation Device

The water circulation device 60 generates supercritical water by using thermal energy of the exhaust gas.

The water circulation device 60 includes, in addition to the heat pipes 70, the heat exchanger 42 and the condenser 43, a water supply passage 61 connecting the water injectors 22 with the condenser 43, a water tank 62, a low-pressure pump 63, and a high-pressure pump 64.

The condenser 43 condenses water (water vapor) within the exhaust gas passing through the exhaust passage 40, and the water condensed by the condenser 43 is supplied to the water injectors 22. Thus in this embodiment, the water within the exhaust gas is used as the water injected into the cylinders 2. The water tank 62 stores the condensed water therein. The condensed water generated by the condenser 43 is introduced into the water tank 62 through the water supply passage 61 and stored in the water tank 62.

The low-pressure pump 63 is disposed at a position of the water supply passage 61 between the water tank 62 and the heat exchanger 42, and pumps the condensed water inside the water tank 62 to the heat exchanger 42. The condensed water in the water tank 62 is pumped to the heat exchanger 42 by the low-pressure pump 63.

The heat exchanger 42 exchanges heat between the condensed water pumped by the low-pressure pump 63 and the exhaust gas passing through the exhaust passage 40. The heat exchanger 42 is disposed at a position of the exhaust passage 40 downstream of the purifying system 41, to be adjacent to the purifying system 41.

In this embodiment, the part 61a of the water supply passage 61 is inserted into the exhaust passage 40 to be in contact therewith, and thus, the heat exchanger 42 is formed. In other words, the heat exchanger 42 is formed by the part 61a of the water supply passage 61 and the exhaust passage 40 so that the exhaust gas passes outside the part 61a. Hereinafter, the part of the water supply passage 61 inserted into the exhaust passage 40 is referred to as the heat exchanging passage 61a.

The heat exchanging passage 61a is inserted into a part of the exhaust passage 40 immediately downstream of the purifying system 41. Specifically, the heat exchanging passage 61a is inserted into the exhaust passage 40 located inside the heat accumulation case 49. Therefore in this embodiment, the heat exchanger 42, as well as the purifying system 41, are heat retained by the heat accumulation case 49.

The condensed water inside the heat exchanging passage 61a is increased in temperature by the exhaust gas passing through the part of the exhaust passage 40 where the heat exchanging passage 61a is inserted. Specifically, if the temperature of the exhaust gas passing through the part of the exhaust passage 40 where the heat exchanging passage 61a is inserted is higher than the temperature of the condensed water inside the heat exchanging passage 61a, the thermal energy is applied to the condensed water from the exhaust gas and the condensed water is increased in temperature. Note that the temperature of the exhaust gas discharged from the engine 1 is constantly at 100° C. or above, which is constantly higher than the temperature of the condensed water in the liquid phase. Therefore, the condensed water inside the heat exchanging passage 61a is always increased in temperature by the exhaust gas.

In this embodiment, since the heat exchanging passage 61a is disposed immediately downstream of the purifying system 41 as described above, the condensed water inside the heat exchanging passage 61a also receives reaction heat at the purifying system 41. Thus the condensed water is effectively increased in temperature. Additionally, the condensed water is effectively increased in temperature by the heat retention of the heat exchanging passage 61a by the heat accumulation case 49.

The high-pressure pump 64 pumps the condensed water from the heat exchanger 42 to the water injectors 22. The high-pressure pump 64 is disposed in the water supply passage 61, between the heat exchanger 42 (i.e., the heat exchanging passage 61a) and the heat pipes 70. The high-pressure pump 64 pressurizes the condensed water increased in temperature by the heat exchanger 42 to generate the supercritical water and pumps it to the water injectors 22.

Here, the supercritical water after being highly pressurized by the high-pressure pump 64, flows through a part of the water supply passage 61 downstream of the high-pressure pump 64. Therefore, this part is piped for high-pressure use.

As described above, in this embodiment, the supercritical water is basically generated by increasing the condensed water in temperature and pressure by the heat exchanger 42 and the high-pressure pump 64, and is supplied to the water injectors 22.

Note that if the temperature of the exhaust gas discharged from the cylinders 2 is comparatively high, the water inside the water supply passage 61 is increased in temperature by this high-temperature exhaust gas, through the heat pipes 70.

Specifically, each heat pipe 70 exchanges heat between the water pumped from the high-pressure pump 64 and the exhaust gas passing through the exhaust passage 40. The heat pipe 70 increases the temperature of the condensed water only when the temperature of the exhaust gas is above a reference temperature.

Figure 5:
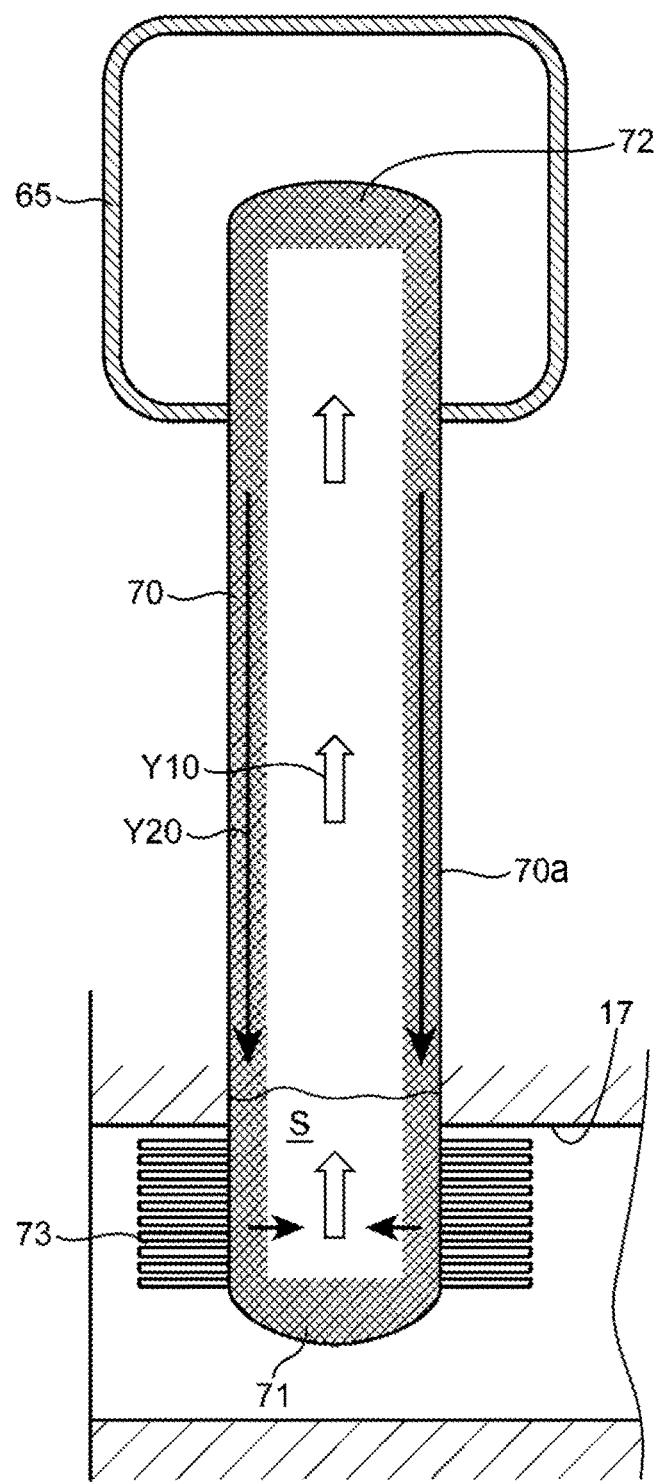
FIG. 5 is a schematic cross-sectional view illustrating an operation of a heat pipe.

In this embodiment, the heat pipe 70 has a substantially circular-column-shaped contour extending in a given direction. FIG. 5 is a schematic cross-sectional view illustrating an operation of the heat pipe 70. As illustrated in this FIG. 5 and also FIG. 2, the heat pipe 70 is arranged so that an end part 71 thereof in its longitudinal directions is inserted into the exhaust port 17 so as to be in contact with the exhaust gas, and the other end part 72 thereof is inserted into the water supply passage 61 so as to be in contact with the water in the water supply passage 61.

As described above with reference to FIGS. 1 and 2, in this embodiment, the heat pipe 70 is inserted into each exhaust port 17. Specifically, a pressure accumulation part 65 extending in an alignment direction of the cylinders 2 is provided to a part of the water supply passage 61 near its downstream end, and independent passages 61b extend toward the water injectors 22, respectively, from the pressure accumulation part 65. Further each exhaust port 17 is provided with one heat pipe 70, and the end parts 71 and 72 of each heat pipe 70 are inserted into the exhaust port 17 and the pressure accumulation part 65, respectively.

In this embodiment, as illustrated in FIG. 2, the pressure accumulation part 65 is disposed near the cylinder head 4, and the heat pipe 70 is built in the cylinder head 4. Specifically, the pressure accumulation part 65 is located above the exhaust ports 17, and the heat pipe 70 extends upward from an inner space of the exhaust port 17 and is inserted into the pressure accumulation part 65. In this embodiment, the end part 71 of the heat pipe 70 on the exhaust port 17 side is provided with a stacked fin 73 formed by stacking metallic plate members in the up-and-down directions, so as to increase the transmitted amount of heat of the exhaust gas in the exhaust port 17 to the end part 71.

As illustrated in FIG. 5, the heat pipe 70 is a pipe member made of a material with high thermal conductivity (e.g., metal), and includes a liquid working medium S therein in a vacuum state. A porous member 70a (e.g., metallic mesh) is provided in an inner wall of the heat pipe 70 to form a capillary structure, a so-called wick.

In the heat pipe 70, the end part 71 inserted into the exhaust port 17 (hereinafter, suitably referred to as "the heat-reception-side end part 71") is warmed up by the exhaust gas and, after exceeding a given temperature, the working medium S vaporizes, and as indicated by the arrow Y10 of FIG. 5, it spreads toward the other end part 72 inserted into the water supply passage 61 (hereinafter, suitably referred to as "the heat-release-side end part 72"). Here, the temperature of the exhaust gas in the exhaust port 17 decreases by applying its thermal energy to the heat pipe 70, i.e., the working medium S. Further the vapor of the working medium S condenses by releasing heat from the heat-release-side end part 72 to the water supply passage 61, and then reverts back to being liquid. Here, the water inside the water supply passage 61 is increased in temperature by receiving the thermal energy from the working medium S. As indicated by the arrow Y20 of FIG. 5, the working medium S, after reverting back to the liquid phase, returns to the heat-reception-side end part 71 due to the capillary action in the porous member 70a, and then retrieves thermal energy from the exhaust gas to change into vapor again. This thermal energy is applied to the water inside the water supply passage 61.

In this embodiment, the temperature of the exhaust gas within which the heat transfer occurs (reference temperature) is set to about 650 K, and the working medium S corresponding thereto is included in the heat pipe 70. For example, the working medium S is cesium.

Thus in this embodiment, when the temperature of the exhaust gas becomes high by exceeding the given temperature and the working medium S exceeds its boiling point due to the heat pipe 70, the thermal energy of the exhaust gas in the exhaust port 17 is applied to the water supply passage 61 and the temperature of the water therein is increased. Therefore, the temperature of the water inside the water supply passage 61 is substantially constantly increased by the heat exchanger 42, and when the temperature of the exhaust gas is high, which is above the reference temperature, the heat pipe 70 increases the temperature of the water inside the water supply passage 61 by the exhaust gas so that the supercritical water is generated by effectively using the energy of the exhaust gas. Especially since the heat pipe 70 is disposed near the cylinder 2, the temperature of the water inside the water supply passage 61 is effectively increased even higher by the heat pipe 70, using the high thermal energy of the exhaust gas. Further, when the exhaust gas temperature is excessively high, the temperature of the exhaust gas which flows into the purifying system 41 is lowered by the heat pipe 70, and when the exhaust gas temperature is low, the exhaust gas is flown into the purifying system 41 as it is so as to keep the purifying system 41 at high temperature. Thus, the temperature of the purifying system 41 is kept within a suitable range.

(5) Control System

Figure 6:
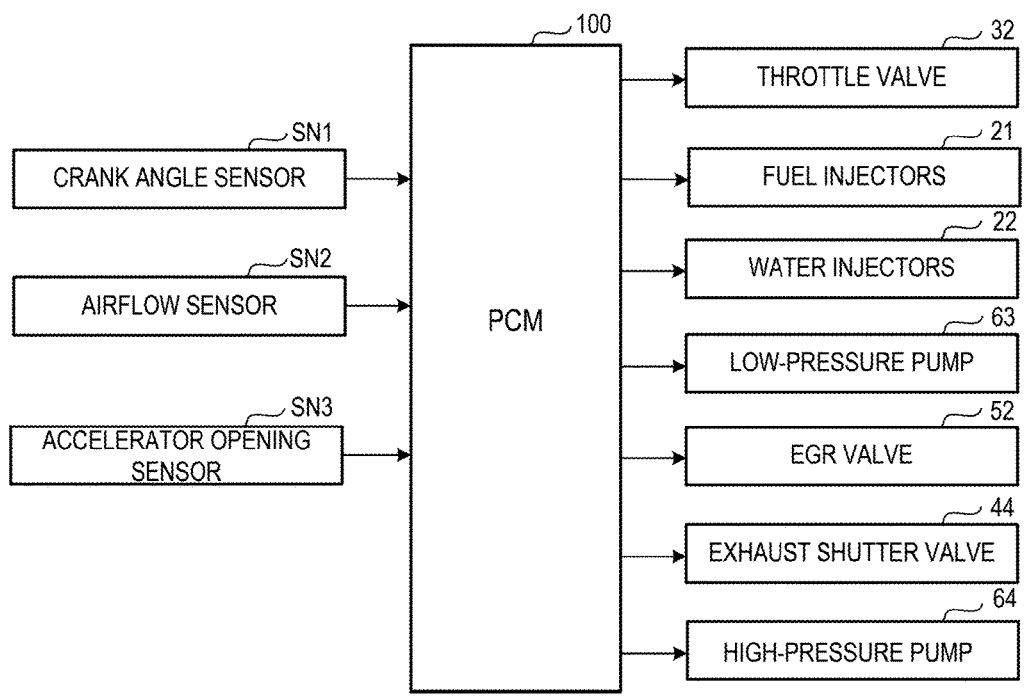
FIG. 6 is a block diagram illustrating a control system of the engine.

FIG. 6 is a block diagram illustrating a control system of the engine. As illustrated in FIG. 6, the engine system of this embodiment is controlled by a Powertrain Control Module (PCM, may be referred to as the controller) 100 as a whole. The PCM 100 is, as well-known, comprised of a microprocessor including a CPU, a ROM, and a RAM.

The PCM 100 is electrically connected with various sensors for detecting an operating state of the engine.

For example, the cylinder block 3 is provided with a crank angle sensor SN1 for detecting a rotational angle and speed of a crankshaft coupled to the pistons 5, in other words, an engine speed. Further, an airflow sensor SN2 for detecting an intake air amount to be sucked into the cylinder 2 through the air cleaner 31 is provided in the intake passage 30, between the air cleaner 31 and the throttle valve 32. Moreover, an accelerator opening sensor SN3 for detecting a position of an accelerator pedal (accelerator opening) which is disposed out of the range of the drawings and controlled by a driver of the vehicle is provided to the vehicle.

The PCM 100 controls respective parts of the engine while performing various determinations, operations etc. based on input signals from the various sensors. Specifically, the PCM 100 is electrically connected with the fuel injectors 21, the water injectors 22, the throttle valve 32, the exhaust shutter valve 44, the EGR valve 52, the low-pressure pump 63, the high-pressure pump 64 etc., and outputs control signals to these components based on results of the operations, etc.

For example, as described above, the throttle valve 32 is closed only in a limited operation condition, such as when the engine is stopped. The PCM 100 closes the throttle valve 32 in such an operation condition.

Further as described above, the PCM 100 controls each fuel injector 21 to inject the fuel into the cylinder 2 mainly before the CTDC.

Figure 7:
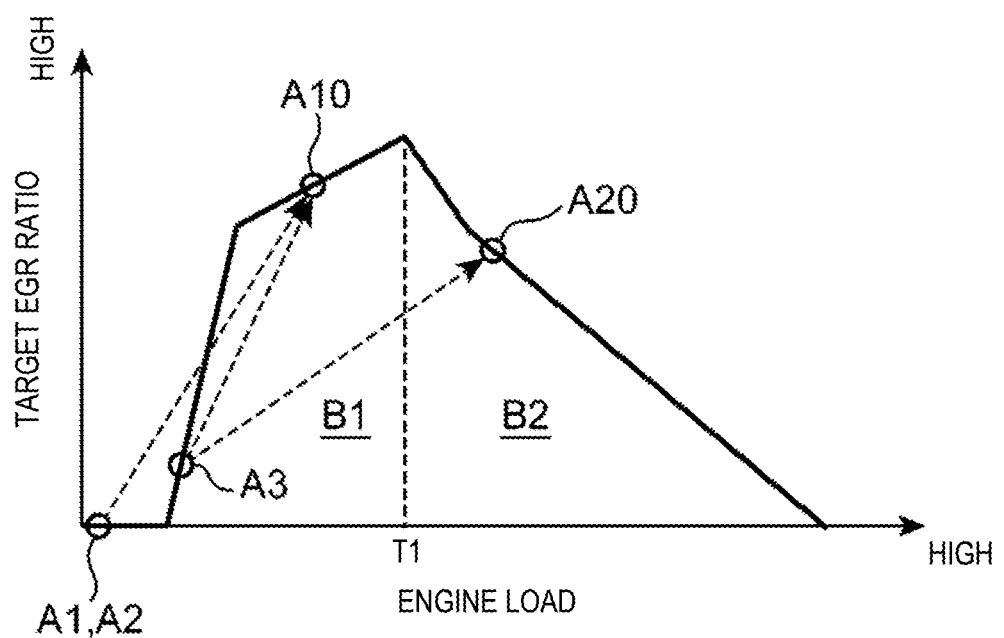
FIG. 7 is a chart illustrating a relationship between an engine load and a target EGR ratio.

Further the PCM 100 sets the target EGR ratio as illustrated in FIG. 7, and controls the opening of the EGR valve 52 to achieve the target EGR ratio.

In this embodiment, within a low engine load range B1 where the engine load is below a reference load T1, the target EGR ratio is set to be higher as the engine load is higher. Within a high engine load range B2 where the engine load is the reference load T1 and above, the target EGR ratio is set to be lower as the engine load is higher. As described above, the ignition delay time is extended by introducing the EGR gas into the cylinder 2. Further the ignition delay time easily becomes shorter as the engine load is higher. Therefore in this embodiment, within the low engine load range B1, the target EGR ratio is set to be higher as the engine load is higher, so that a suitable ignition delay time is obtained and the suitable premixed charge compression self-ignition combustion is realized at each engine load. Meanwhile, within the high engine load range B2, a large amount of intake air (fresh air) needs to be introduced into the cylinder 2 so as to secure a sufficient engine torque. Therefore in this embodiment, within the high engine load range B2, the target EGR ratio is set to be lower as the engine load is higher, so as to secure the intake air amount corresponding to the engine load while suitably adjusting the ignition delay time by, for example, splitting the fuel and injecting it into the cylinder 2.

The PCM 100 changes the opening of the EGR valve 52 so as to achieve the target EGR ratio. For example, the opening of the EGR valve 52 is increased when the target EGR ratio is high. Further, in a case of introducing the EGR gas into the cylinder 2, if the engine load is low and the pressure within the exhaust passage 40 is low, the PCM 100 narrows the opening of the exhaust shutter valve 44 as described above to stimulate the recirculation of EGR gas.

Here, the EGR gas passes through the EGR passage 51 and the intake passage 30 from the exhaust passage 40 and is recirculated into the cylinder 2. Therefore, a time delay occurs for the EGR gas amount, which is introduced into the cylinder 2, and the EGR ratio to actually change after the PCM 100 issues the command to the EGR valve 52. Further, once the change of the EGR ratio delays, the suitable ignition delay time is not secured and the suitable premixed charge compression self-ignition combustion is not realized. Specifically, the EGR gas amount become insufficient and the ignition time delay becomes shorter, and as a result, a so-called pre-ignition may occur, and smoke production and combustion noise may increase.

In this regard, for example, it may be considered to reduce the fuel amount supplied into the cylinder 2 before the EGR ratio reaches the target value. However in this case, engine torque responsiveness may degrade.

Figure 8:
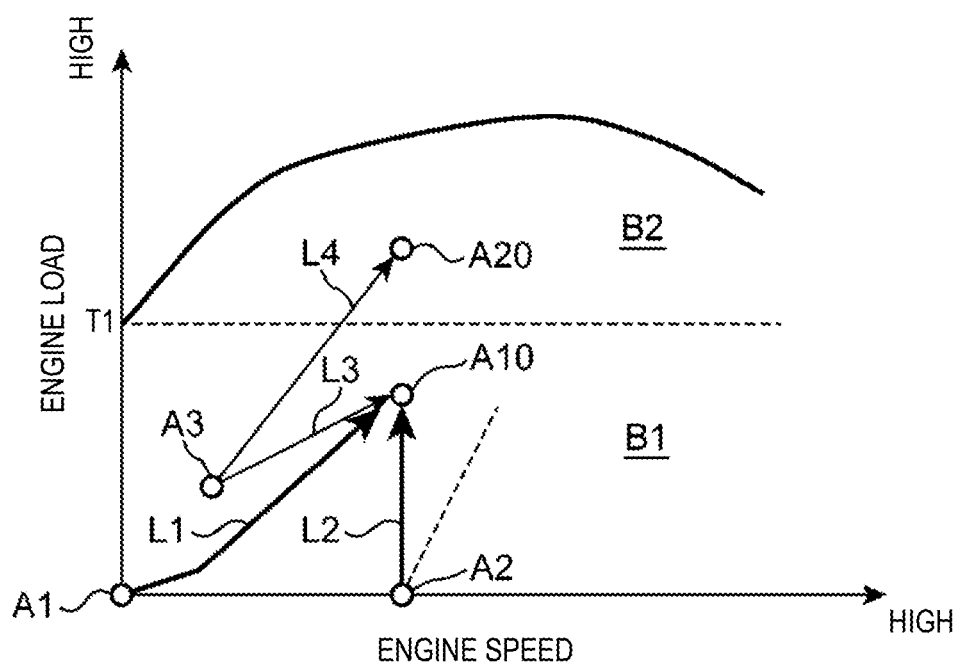
FIG. 8 is a chart illustrating changes of the engine load when accelerating after a fuel supply suspension (F/C: Fuel Cut) and resuming from an idle stop.

Especially as indicated by the line L1 of FIG. 8, when the engine resumes and reaccelerates after an idle stop is performed (i.e., the fuel supply into the cylinder 2 is automatically suspended in accordance with a vehicle stop), or when the engine accelerates after the fuel supply into the cylinder 2 is suspended in accordance with deceleration as indicated by the line L2 of FIG. 8 (i.e., when accelerating after decelerating once), the engine load (engine torque) is required to be sharply increased, for example, from a point A1 or A2 to a point A10 (FIG. 8), and simultaneously, the EGR ratio is required to be sharply increased from a point A1 or A2 to a point A10 as illustrated in FIG. 7. Here, if the fuel supply amount for the cylinder 2 is restricted in accordance with the delay of the change of the EGR ratio, the engine torque does not increase and the acceleration performance significantly degrades. Also when accelerating to transition from a state where the engine load is low (e.g., A3) to a state where the engine load is high (A10 or A20) as indicated by lines L3 and L4, since the EGR ratio may be increased, similar issues arise.

Figure 9:
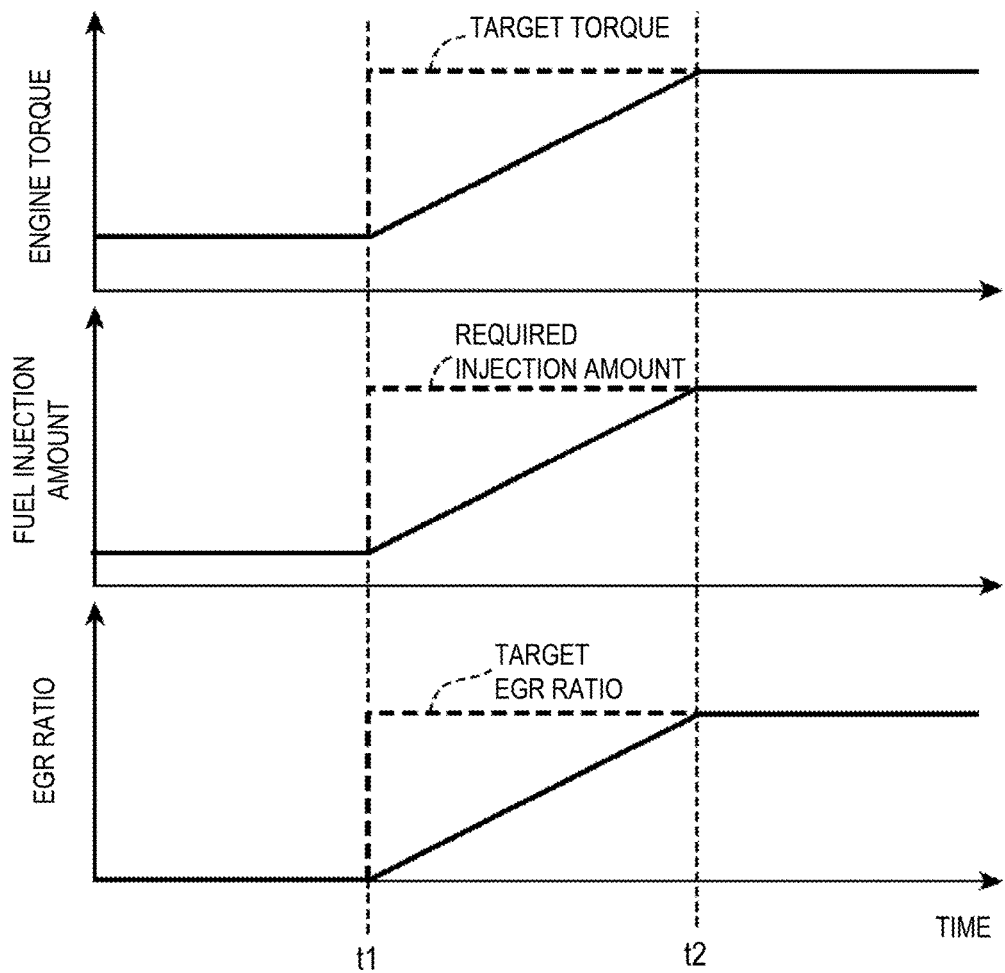
FIG. 9 shows charts illustrating issues in increasing the target EGR ratio.

A specific description regarding this matter is given with reference to FIG. 9, which shows charts illustrating time changes of the engine torque, the fuel injection amount (the fuel amount supplied into the cylinder 2), and the EGR ratio. As illustrated in FIG. 9, when a resume from the idle stop, acceleration after decelerating once, or acceleration for increasing the engine load is performed at a time point t1, a target torque (dashed line) that is a target value of the engine torque is sharply increased and, accordingly, the target EGR ratio (dashed line) also sharply increases. However, as indicated by the solid line, the actual EGR ratio does not immediately follow the target EGR ratio, which causes pre-ignition. In this regard, if the fuel injection amount is maintained below a required injection amount (the fuel injection amount corresponding to the target torque) corresponding to the actual EGR ratio, although the pre-ignition is prevented, the engine torque indicated by the solid line is obtained, which indicates that the target torque is not realized until a time point t2 at which the actual EGR ratio reaches the target EGR ratio. Thus, the acceleration feel degrades.

Thus in this embodiment, when the target EGR ratio is increased and one of the resume from the idle stop, the acceleration after decelerating once, and the acceleration for increasing the engine load is performed, the supercritical water is injected into the cylinder 2 from the water injector 22 to compensate the insufficiency of the EGR gas with water. Specifically, since the water (neither fuel nor air) functions as the inactive substance similarly to the EGR gas inside the cylinder 2, by injecting the water into the cylinder 2, the insufficient amount of the EGR gas is compensated so as to leave a suitable amount of inactive substance inside the cylinder 2.

Figure 10:
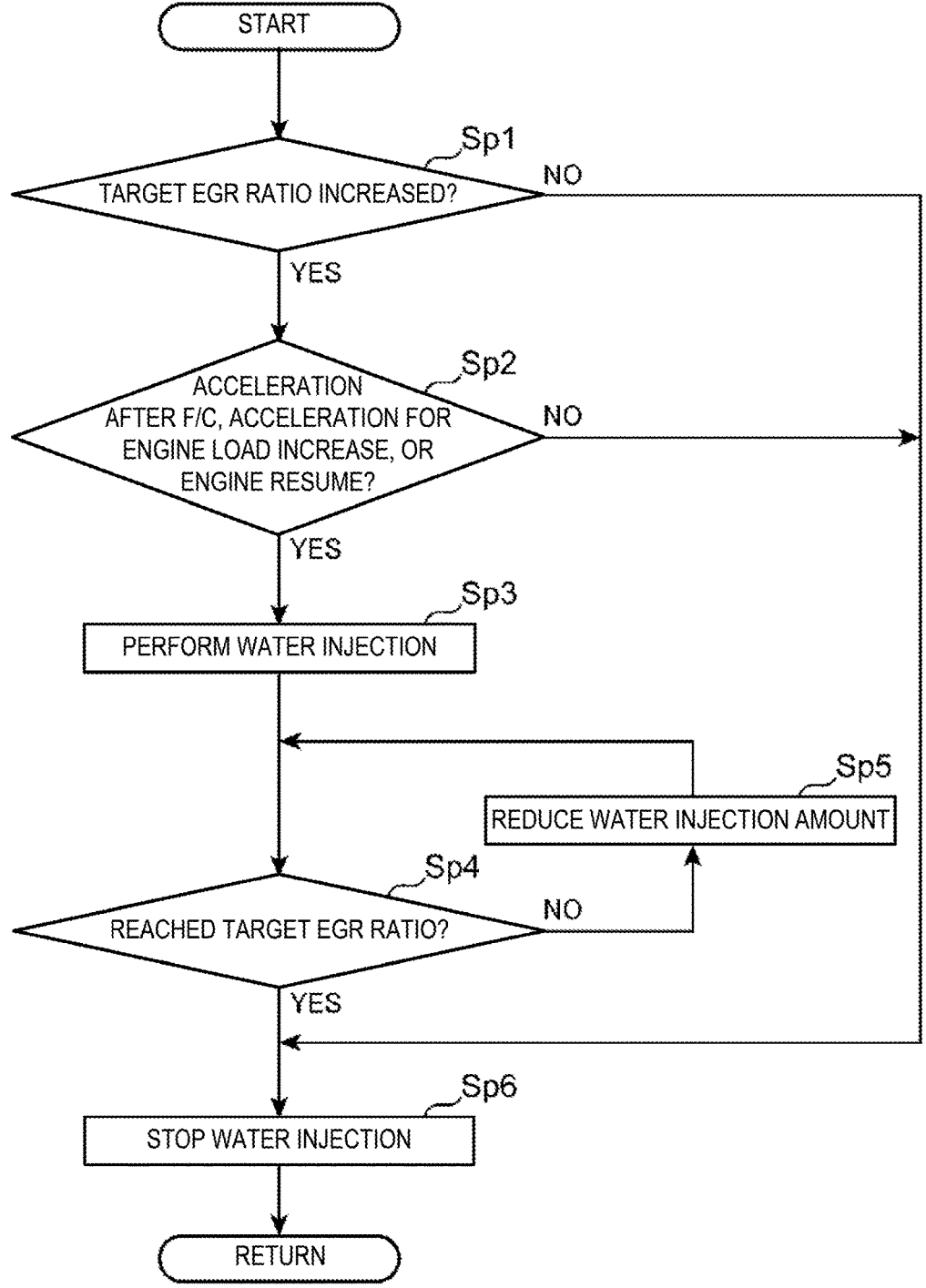
FIG. 10 is a flowchart illustrating a control procedure according to water injection.

A control procedure of this water injection is described in detail with reference to FIG. 10.

First at Sp1, whether the target EGR ratio is increased is determined. If the determination result is NO and the target EGR ratio is not increased, the control ends. On the other hand, if the determination result is YES and the target EGR ratio is increased, the control proceeds to Sp2. Note that here, the opening of the EGR valve 52 is increased as the target EGR ratio is increased, as described above.

At Sp2, whether the engine is in one of acceleration after a fuel supply suspension (F/C: Fuel Cut) accompanying deceleration, acceleration for increasing the engine load, and engine resume and reacceleration from the idle stop is determined. For example, whether the engine is in the acceleration after decelerating once is determined based on a command on the fuel injector 22, whether the engine is in the acceleration for increasing the engine load is determined based on the engine load calculated based on the signal from the accelerator opening sensor SN3, and whether the engine is in the engine resume and reacceleration from the idle stop is determined based on a separately obtained signal regarding the resume operation, and the engine load.

If the determination result at Sp2 is NO, the control ends. On the other hand, if the determination result at Sp2 is YES and one of the acceleration after decelerating once, the acceleration for increasing the engine load, and the engine resume and reacceleration from the idle stop is performed, the control proceeds to Sp3.

At Sp3, the supercritical water is injected into the cylinder 2 by the water injector 22.

Then the control proceeds to Sp4 where whether the actual EGR ratio has reached the target EGR ratio is determined. Here the PCM 100 constantly calculates the EGR ratio based on the signal from the airflow sensor SN2, etc., and at Sp4, it compares the calculated EGR ratio with the target EGR ratio set as illustrated in FIG. 7.

If the determination result at Sp4 is NO and the actual EGR ratio has not reached the target EGR ratio, the control proceeds to Sp5 where the injection of the supercritical water into the cylinder 2 is continued. Note that, the injection amount of the supercritical water into the cylinder 2 is smaller than that at Sp3.

After Sp5, the control returns to Sp4 to determine again whether the actual EGR ratio has reached the target EGR ratio. If this determination result is NO, the control proceeds to Sp5 again to continue the injection of the supercritical water into the cylinder 2. Note that here, the injection amount of the supercritical water into the cylinder 2 is smaller than the previous injection at the last Sp5. Then the control proceeds to Sp4.

As described above, in this embodiment, the injection of the supercritical water into the cylinder 2 by the water injector 22 is continued for a given period until the actual EGR ratio reaches the target EGR ratio. Further, the amount of the supercritical water injected into the cylinder 2 is reduced with time.

If the determination result at Sp4 is YES and the actual EGR ratio has reached the target EGR ratio, the control proceeds to Sp6 where the water injection, i.e., the supercritical water injection into the cylinder 2 is stopped. Note that in this embodiment, the given period is a period while the target and actual EGR ratios have a gap therebetween; however, it may be a period until slightly before the gap is eliminated, or a period until slightly after the gap is eliminated.

(6) Effects

Figure 11:
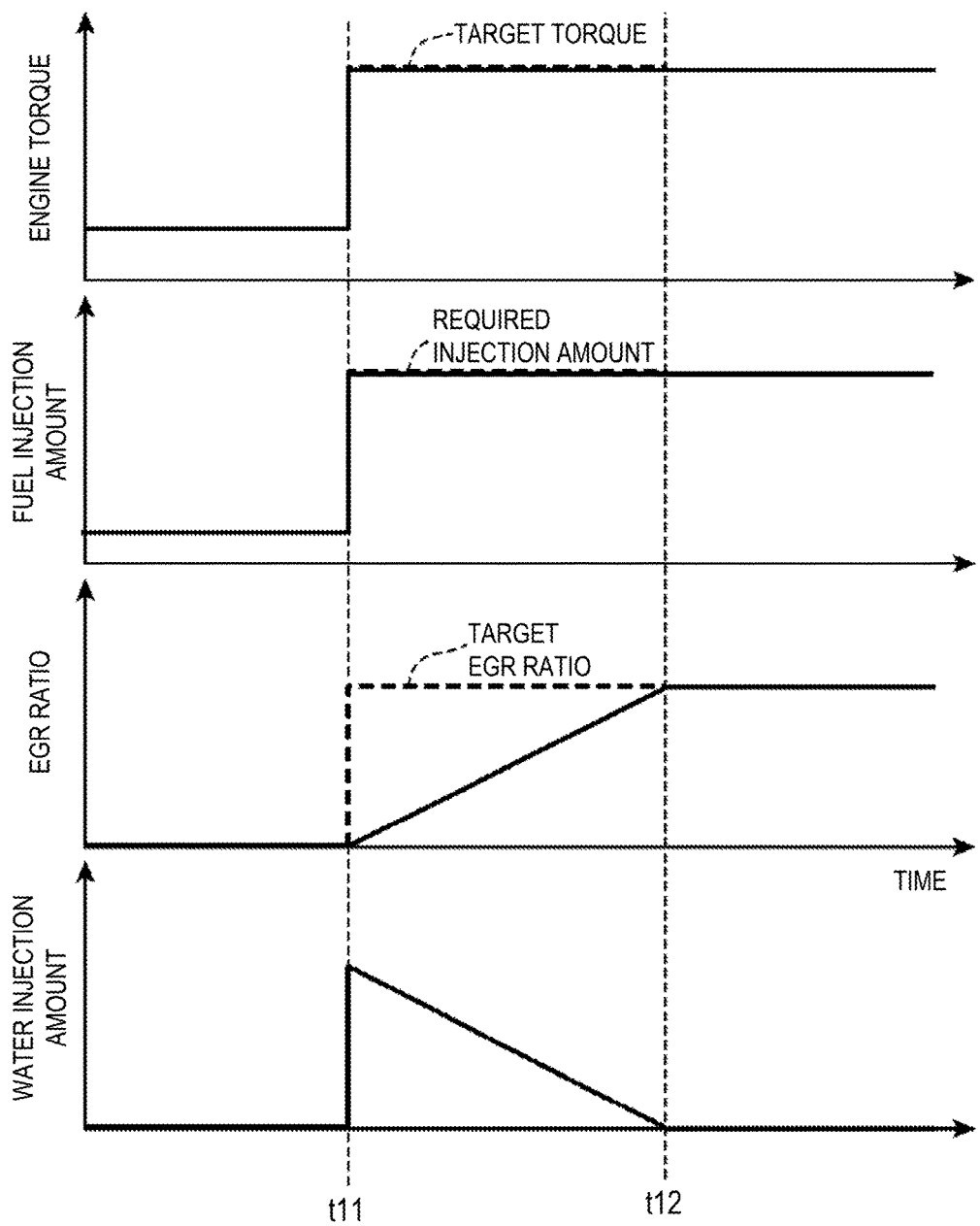
FIG. 11 shows charts illustrating effects according to the embodiment.

FIG. 11 illustrates time changes of the engine torque, the fuel injection amount, the EGR ratio, and the water injection amount (the injection amount of the supercritical water into the cylinder 2) when the water injection control described above is performed. When one of the acceleration after decelerating once, the acceleration for increasing the engine load, and the engine resume and reacceleration from the idle stop is performed at a time point t11, the target torque (dashed line) which is the target value of the engine torque sharply increases and the target EGR ratio (dashed line) sharply increases. Accordingly, the supercritical water injection into the cylinder 2 is started at the time point t11. Then, the water injection amount is reduced with time, i.e., as the actual EGR ratio increases, and the supercritical water injection into the cylinder 2 is stopped at a time point t12 when the actual EGR ratio reaches the target EGR ratio.

By performing such a supercritical water injection into the cylinder 2, the insufficiency of the EGR gas (i.e., inactive substance) inside the cylinder 2 is compensated by the supercritical water, and the suitable amount of inactive substance is left inside the cylinder 2. Therefore, there is no need to lower the fuel injection amount into the cylinder 2 with respect to the required injection amount in order to prevent pre-ignition. Thus, as illustrated in FIG. 11, it is possible to inject the required injection amount of fuel into the cylinder 2 at the time point t11 as indicated by the solid line, and sharply increase the engine torque as needed at the time point t11 as indicated by the solid line. Additionally, it is possible to suitably keep the amount of inactive substance inside the cylinder 2 also until the time point t12, and as a result, a suitable combustion is achieved.

As described above, in this embodiment, the acceleration performance, i.e., the engine responsiveness, is improved while preventing pre-ignition and realizing the suitable combustion.

Especially in this embodiment, the supercritical water injection control is performed when the target EGR ratio is increased and one of the acceleration after decelerating once, the acceleration for increasing the engine load, and the engine resume and reacceleration from the idle stop is performed. Therefore, in these cases where the acceleration performance is particularly required, the engine torque is sharply increased and comfort when driving the vehicle is increased.

Further in this embodiment, the supercritical water (i.e., water) is injected into the cylinders 2. Therefore, the suitable amount of water is introduced into the cylinder more reliably while suppressing an energy loss.

In other words, as described above, the supercritical water has the higher density than water in the normal gas phase (water vapor). Therefore, by injecting the supercritical water into the cylinder, a large amount of water is efficiently introduced into the cylinder compared to injecting the water in the gas phase. Thus, the insufficient amount of the EGR gas is compensated more reliably. Further, as described above, water in the liquid phase requires latent heat in order to vaporize. Therefore, if the water in the liquid phase is injected into the cylinder, a temperature inside the cylinder may significantly drop due to the vaporization of the injected water inside the cylinder, and thermal efficiency may degrade. On the other hand, the supercritical water does not require latent heat. Therefore, by injecting the supercritical water into the cylinder 2, the significant temperature drop and thermal efficiency degradation described above are avoided, and the energy loss is suppressed small.

(7) Modifications

Figure 4:
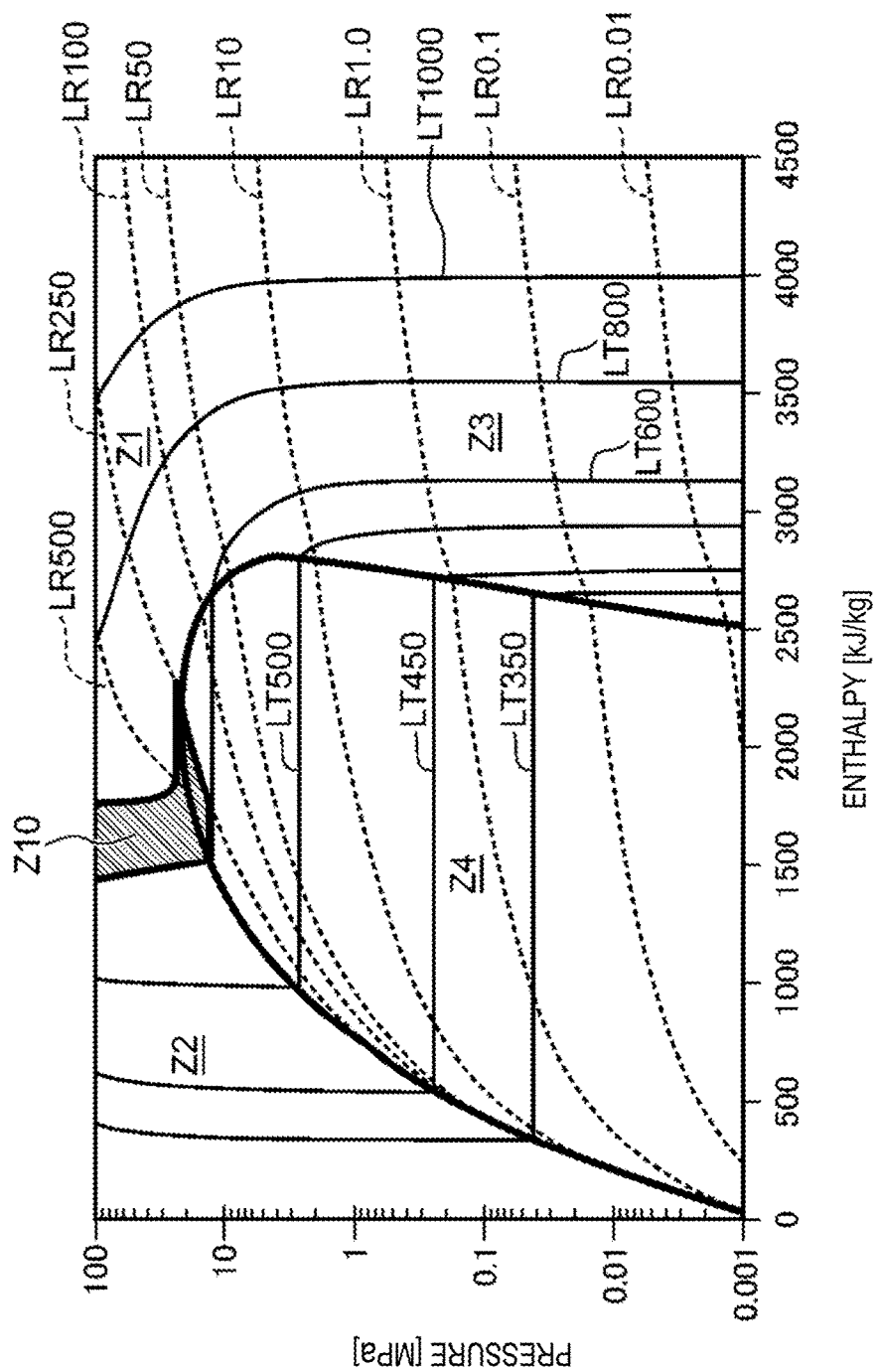
FIG. 4 is a pressure-enthalpy diagram for water, illustrating subcritical water.

Here, as is apparent from FIG. 3, water which belongs to an area near the area Z1 has a high density and requires low latent heat to change into gas, which are properties similar to the supercritical water. Therefore, although the supercritical water is injected into the cylinder 2 in this embodiment, instead of the supercritical water, subcritical water which is water belonging to the area near the area Z1 may be generated and injected into the cylinder 2. For example, subcritical water within an area Z10 where the temperature is 600 K or above and the density is 250 kg/m$^3$ or above (see FIG. 4) may be generated and injected. Also in this case, since the density is higher than normal water and a required latent heat is extremely low, the suitable amount of water enough to compensate for the insufficient amount of EGR gas is supplied into the cylinder 2 while suppressing the energy loss.

Alternatively, normal water (e.g., water in a liquid phase) may be injected into the cylinder 2. Also in this case, the water is able to compensate for the insufficient amount of EGR gas, and thus, the engine responsiveness is improved while realizing the suitable combustion. Note that by injecting the supercritical water or the subcritical water into the cylinder 2 rather than the normal water, the insufficient amount of EGR gas is compensated by water more reliably while suppressing the energy loss.

Further in this embodiment, the case is described, where the supercritical water is injected into the cylinder 2 only when particular conditions are met, such as the target EGR ratio is increased and the engine is in one of the acceleration after decelerating once, the acceleration for increasing the engine load, and the engine resume and reacceleration from the idle stop, and otherwise the supercritical water injection into the cylinder 2 is stopped; however, the supercritical water may be injected constantly or only within a given engine operating range, and the amount of the supercritical water injected into the cylinder 2 may be increased when the particular conditions are met. For example, an initial amount of the supercritical water injected into the cylinder 2 may be set according to the engine speed, the engine load, etc., the water injector 22 may be controlled to achieve the initial amount in a normal engine operation, and the amount of the supercritical water injected into the cylinder 2 may be increased from the initial amount when the particular conditions are met. Note that in this case, the amount of the supercritical water injected into the cylinder 2 may be reduced over time within a range above the initial amount, for a given period of time since the particular conditions are met.

Alternatively, the supercritical water may be injected into the cylinder 2 (water injection amount may be increased) if the target EGR ratio is increased, regardless of resuming or accelerating the engine. Note that all of the acceleration after decelerating once, the acceleration for increasing the engine load, and the engine resume and reacceleration after the idle stop particularly require high acceleration performance. For this reason, by injecting the supercritical water (increasing the injection amount of the supercritical water) in accordance with the increase of the target EGR ratio for these cases only, it is possible to suppress the energy required for driving of the low-pressure pump 63 and the high-pressure pump 64 for the supercritical water injection (increase of the injection amount).

Further, the engine to which the water injection control is applied is not limited to the engine in which the premixed charge compression self-ignition combustion is performed, and it may be an engine in which compression self-ignition combustion is performed without mixing the fuel and air, or a spark-ignition engine in which combustion starts due to ignition.

Further in this embodiment, the prevention of pre-ignition of which occurrence accompanies the delay of the increase of the EGR ratio is given as an effect; however, according to this embodiment, it is also possible to suppress an increase of $NO_x$ which accompanies the delay of the increase of the EGR ratio.

Figure 12:
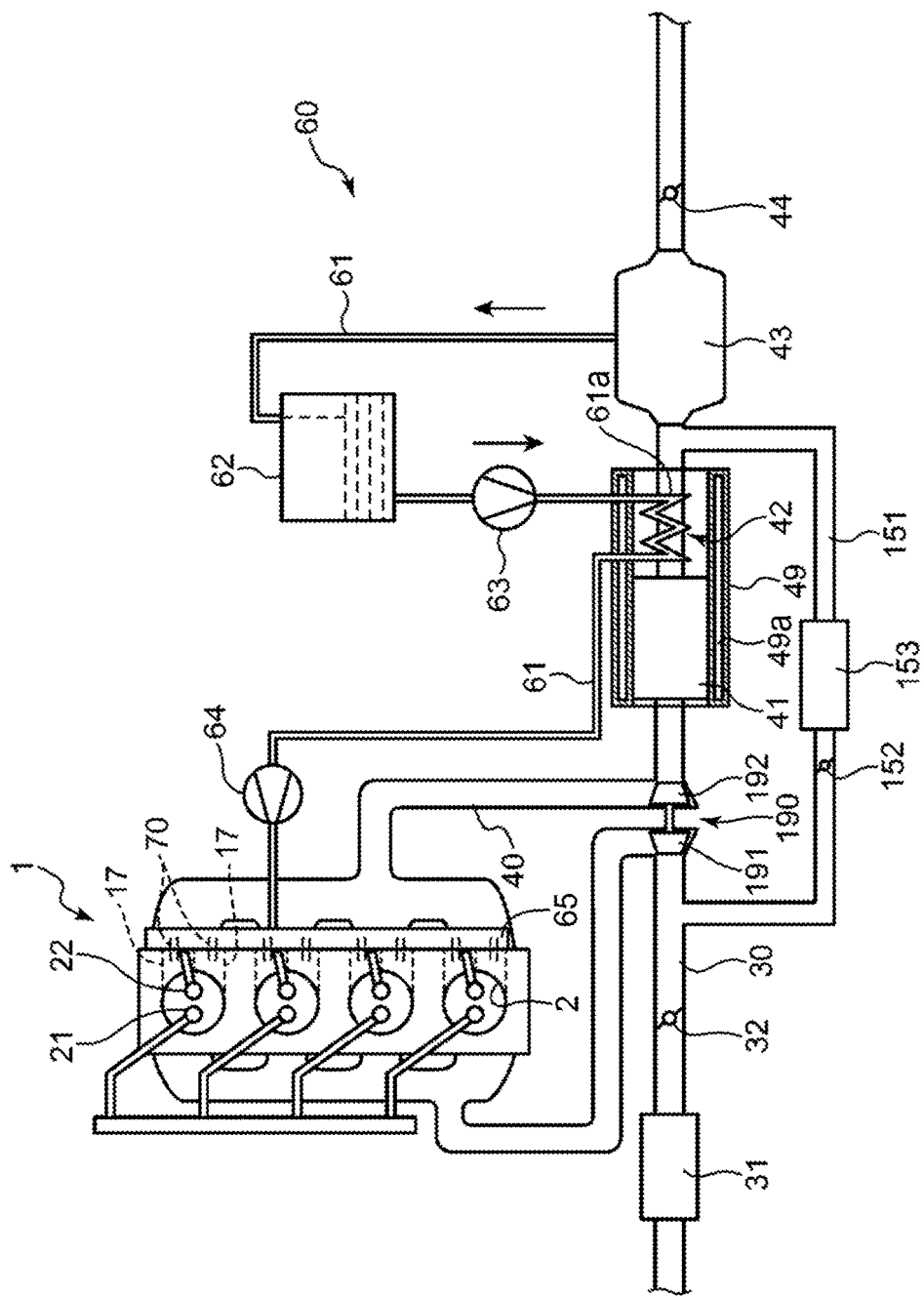
FIG. 12 is a view illustrating a structure of an engine system according to another embodiment of the present invention.

Further, the water injection control of this embodiment is more effective if applied to an engine system as illustrated in FIG. 12.

Specifically the engine system of FIG. 12 is provided with a turbocharger 190. Further, the intake passage 30 is provided with the air cleaner 31, the throttle valve 32, and a compressor 191 in this order from its upstream side, and the exhaust passage 40 is provided with a turbine 192, the purifying system 41, the heat exchanger 42, and the condenser 43 in this order from its upstream side. Moreover, an EGR passage 151 communicates a part of the exhaust passage 40 between the heat exchanger 42 and the condenser 43, with a part of the intake passage 30 between the throttle valve 32 and the compressor 191. The EGR passage 151 is provided with an EGR cooler 153 and an EGR valve 152. With the engine system structured as above, compared to the engine system illustrated in FIG. 1, the length of the part where the EGR gas flows becomes longer and time delay regarding the EGR ratio becomes longer. Thus, if the water injection control is not performed, combustion becomes unstable for a longer period, and acceleration may become not performable. Therefore with such an engine system, by performing the water injection control, suitable combustion is more effectively realized and the acceleration performance is more effectively improved. Note that in FIG. 12, the same reference characters are denoted for the same components as the engine system of FIG. 1.

Further, the water circulation device 60 may be omitted and, for example, a heater may separately be provided to generate supercritical water. Note that by providing the water circulation device 60 as described above, it is possible to improve the energy efficiency.

Further, the relationship between the engine load and the EGR ratio is not limited to the above description.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

1 Engine
2 Cylinder
21 Fuel Injector (Fuel Supplier)
22 Water Injector
30 Intake Passage
40 Exhaust Passage
51 EGR Passage
52 EGR Valve (EGR Ratio Controller)
100 PCM (Controller)

What is claimed is:

1. A control system of an engine including a cylinder, an intake passage for introducing intake air into the cylinder, and an exhaust passage into which exhaust gas is discharged from the cylinder, comprising:

a fuel injector for injecting fuel into the cylinder;
an exhaust gas recirculation (EGR) passage communicating the intake passage with the exhaust passage and for recirculating, as EGR gas, a portion of the exhaust gas in the exhaust passage back to the cylinder;
an EGR valve capable of controlling an EGR ratio by changing an amount of the EGR gas recirculated to the cylinder, the EGR ratio being a ratio of the EGR gas with respect to all gas inside the cylinder;
a water injector for injecting water into the cylinder; and
a controller for controlling the fuel injector, the EGR valve, and the water injector,
wherein the controller controls the EGR valve to set a target EGR ratio according to an operating state of the engine so as to bring an actual EGR ratio to the target EGR ratio, and when the target EGR ratio is increased, the controller controls the water injector to increase an amount of the water injected into the cylinder, the target EGR ratio being a target value of the EGR ratio.

2. The system of claim 1, wherein the water is one of supercritical water and subcritical water.

3. The system of claim 1, wherein the controller controls the water injector to increase the amount of the water injected into the cylinder in accordance with the increase of the target EGR ratio, and then reduce the water injection amount over time.

4. The system of claim 1, wherein the controller controls the water injector to increase the amount of the water injected into the cylinder when the target EGR ratio is increased and fuel injection into the cylinder from the fuel injector is suspended in accordance with deceleration of the engine and then is resumed.

5. The system of claim 1, wherein the controller controls the water injector to increase the amount of the water injected into the cylinder when the target EGR ratio is increased and fuel injection into the cylinder from the fuel injector is automatically suspended in accordance with a stop of a vehicle and then is resumed, the engine mounted on the vehicle.

6. The system of claim 1, wherein the controller controls the water injector to increase the amount of the water injected into the cylinder when the target EGR ratio is increased and an engine load is increased.

* * * * *